United States Patent [19]

Gause et al.

[11] Patent Number: 4,627,355
[45] Date of Patent: Dec. 9, 1986

[54] JOINT RELEASE MECHANISM

[75] Inventors: James E. Gause, Severna Park; Ronald E. Armiger, Millersville, both of Md.

[73] Assignee: Westinghouse Electric Corp., Pittsburgh, Pa.

[21] Appl. No.: 622,298

[22] Filed: Jun. 19, 1984

[51] Int. Cl.4 ............................................. F42B 15/10
[52] U.S. Cl. ........................................ 102/378; 367/4; 102/387; 89/1.54
[58] Field of Search .................... 367/4; 102/378, 387; 89/1.54

[56] References Cited

U.S. PATENT DOCUMENTS

| 2,551,609 | 5/1951 | Kohr et al. | 102/387 X |
| 2,723,876 | 11/1955 | Langlois et al. | 102/387 X |
| 3,140,886 | 7/1964 | Cotilla et al. | 367/4 X |
| 3,729,154 | 4/1973 | Deplante | 102/378 X |
| 3,971,290 | 7/1976 | Blain | 102/378 X |
| 3,990,344 | 11/1976 | Hansen | 102/406 X |
| 4,187,782 | 2/1980 | Grace | 102/475 |
| 4,499,829 | 2/1985 | Jacobson et al. | 102/378 |
| 4,505,203 | 3/1985 | Brady et al. | 102/293 X |
| 4,530,269 | 7/1985 | Rau et al. | 102/378 X |

FOREIGN PATENT DOCUMENTS 2062087 7/1972 Fed. Rep. of Germany ...... 102/378

Primary Examiner—Peter A. Nelson
Attorney, Agent, or Firm—Dean Schron

[57] ABSTRACT

A separable joint for a two-part oceonographic sensor package wherein the two parts are cylindrically shaped and joined by a cylinder of chemically tempered glass. A pyrotechnic device inside the unit will, upon command, activate to shatter the glass thereby effecting separation. A second and similar pyrotechnic device is provided for redundancy.

11 Claims, 8 Drawing Figures

JOINT RELEASE MECHANISM

BACKGROUND OF THE INVENTION

1. Field of the Invention

The invention in general relates to separable structures, and more particularly to a release arrangement for separating the structures.

2. Description of the Prior Art

A variety of systems exist which require a quick release mechanism for separating two bodies connected together at a joint. By way of example, in the field of oceanographic data gathering, a sensor system may be air dropped to a specific location in the ocean for gathering various data relative to that location and for transmitting such data to a remote location.

In one type of air-dropped system, a multipart vehicle is utilized wherein one part descends to the ocean bottom to serve as an anchor for a tethered array of sensors, while a second part floats at the surface and includes the means for transmitting the data gathered by the sensors.

Since a single unit is air dropped, it must separate into its two (or more) portions generally upon impact with the water or shortly thereafter. The unit, therefore, must include a separable joint which, upon command, will split the vehicle into the required components. Some release mechanisms for this purpose utilize pins which are often limited by their load-carrying ability. Another solution involves the use of V-bands which generally are expensive to machine and usually require a number of hinge joints with pins and bolts, the arrangement requiring either gas-pressure operated bolt cutters or explosive bolts.

The release arrangement of the present invention eliminates the need for pins, hinges, V-bands, bolt cutters or explosive bolts and has an extremely high separation reliability. Further, the mechanism is relatively inexpensive to produce and is small in cross-section thereby providing a large usable volume inside the oceanographic unit.

SUMMARY OF THE INVENTION

The joint release mechanism of the present invention includes a first cylindrical body portion having a longitudinal axis and a second cylindrical body portion coaxially arranged therewith. A cylindrically shaped member of frangible material is affixed to both the first and second cylindrical body portions to secure them in position relative to one another and means are provided for breaking the frangible material thereby allowing the first and second cylindrical body portions to separate. In a preferred embodiment, the cylindrical members are right circular cylinders and the frangible material is chemically tempered glass.

DESCRIPTION OF THE PREFERRED EMBODIMENT

Although the present invention is applicable to a variety of different systems, it will be described by way of example with respect to an air-dropped oceanographic instrumentation device.

Figure 1D:
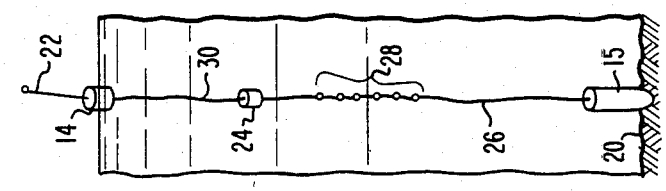
FIGS. 1A-1D illustrate the deployment of an oceanographic instrumentation package.
Figure 1C:
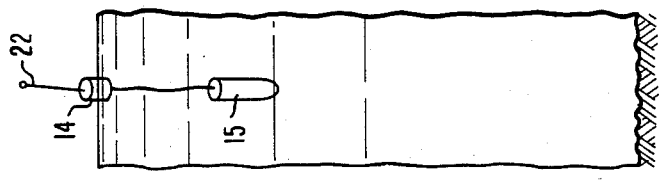
Figure 1B:
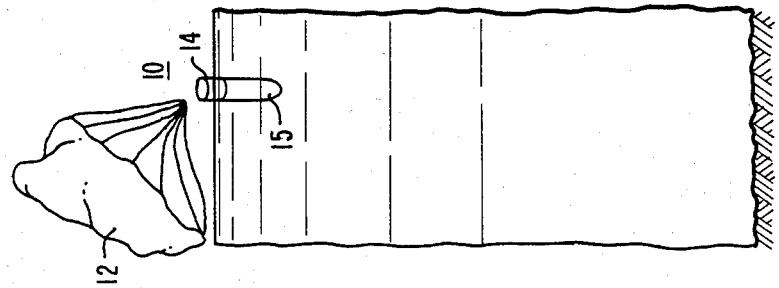
Figure 1A:
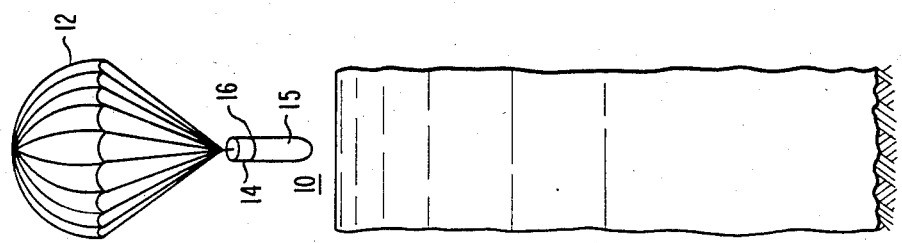

In FIG. 1A an oceanographic sensor package 10 is in the process of being air dropped by parachute 12 to a specific location in the ocean. The sensor package which carries the instrumentation includes a first cylindrical body portion 14 and a second cylindrical body portion 15 separable at a joint 16.

FIG. 1B illustrates the package entering the water and prior to which time parachute 12 has been ejected.

Upon entering the water or shortly thereafter, the two sections 14 and 15 separate by means of a joint release mechanism whereby the positivly buoyant portion 14 may remain at the surface while the negatively buoyant portion 15 descends toward the ocean bottom 20, as depicted in FIG. 1C. Upper portion 14 includes a radio transmitter as well as a mechanism for extending antenna 22.

As the lower portion 15 descends toward the ocean bottom 20, and as depicted in FIG. 1D, a sub-surface buoy 24 is deployed and is connected to portion 15 by means of a mooring line 26 to which is connected a sensor array 28. Portion 15 thus serves as an anchor and information from the sensor array is provided to the transmitting means in portion 14 by means of electromechanical cable 30.

Figure 2:
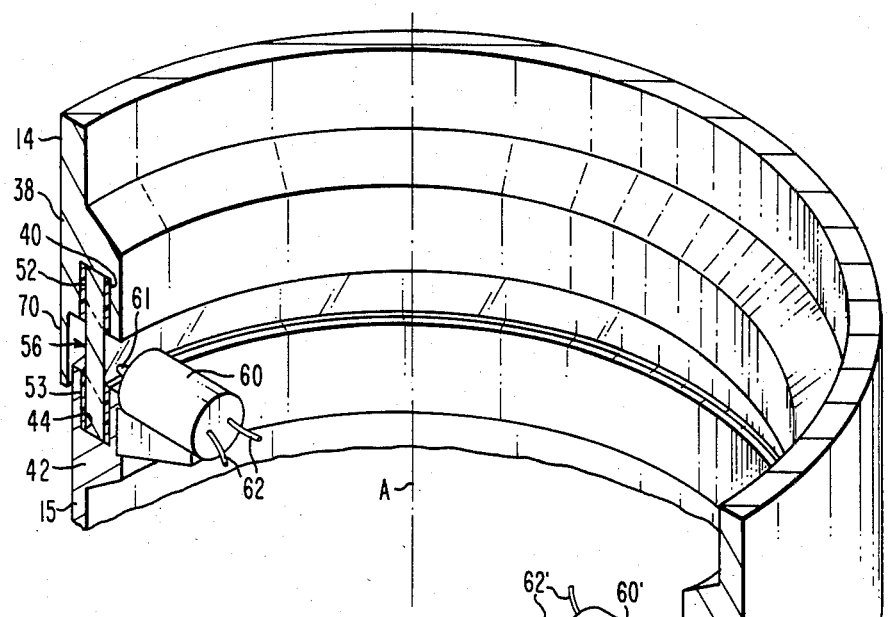
FIG. 2 is a view of the instrumentation package of FIG. 1, with portions broken away to illustrate one embodiment of the present invention.

A joint release mechanism in accordance with the present invention for separating the two portions is illustrated in FIG. 2. The first and second cylindrical body portions 14 and 15 are concentrically arranged about a longitudinal central axis A and are preferably in the form of right circular cylinders.

The lower end of portion 14 includes an enlarged section 38 having a notch 40 formed therein. In a similar fashion, the upper end of portion 15 includes an enlarged section 42 also having a formed notch 44.

Figure 3:
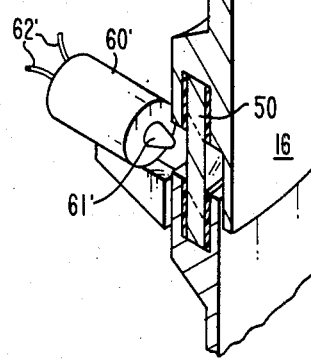
FIG. 3 illustrates the frangible material utilized in the present invention.
Figure 3:
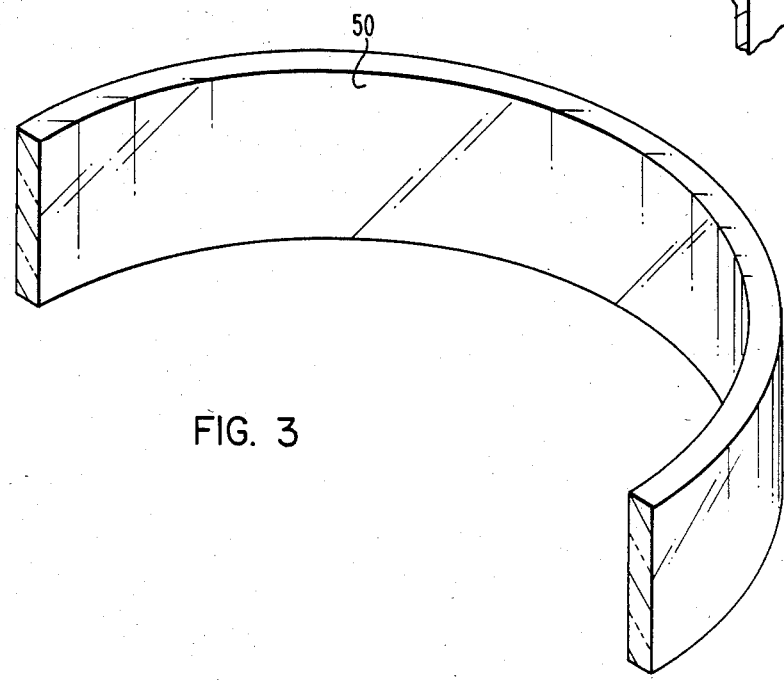

The facing ends of portions 14 and 15 are maintained in spaced-apart relationship by means of a frangible material 50 in the form of a right circular cylinder as illustrated in FIG. 3 and which is inserted into respective notches 40 and 44. Bonding materials such as epoxy 52 and 53 maintain the cylinder of frangible material immobilized within respective notches 40 and 44 with an exposed window 56 therebetween.

A cylinder of frangible material as illustrated in FIG. 3 is made of glass, and preferably a chemically tempered glass. For equivalent sizes, a chemically tempered glass cylinder is stronger than a comparable thermally tempered glass cylinder.

Figure 4:
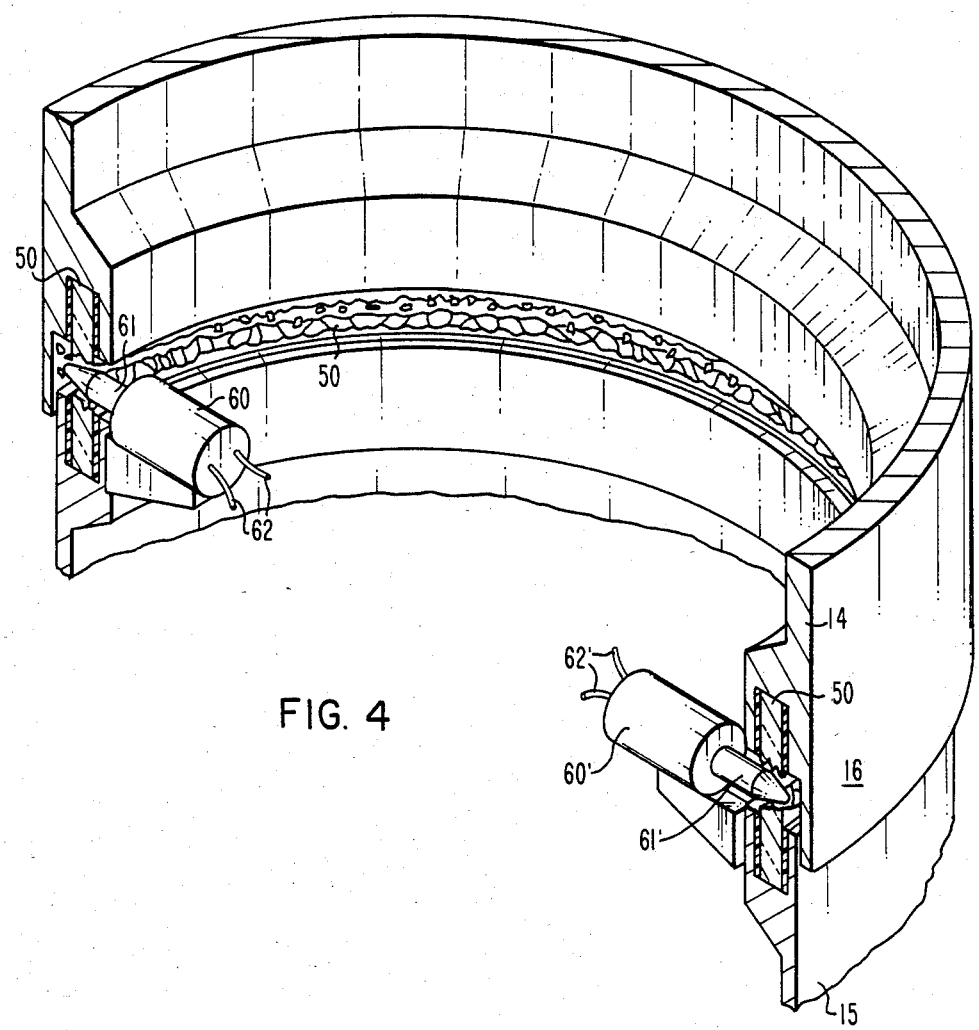
FIG. 4 is a view as in FIG. 2 further illustrating joint separation.
Figure 5:
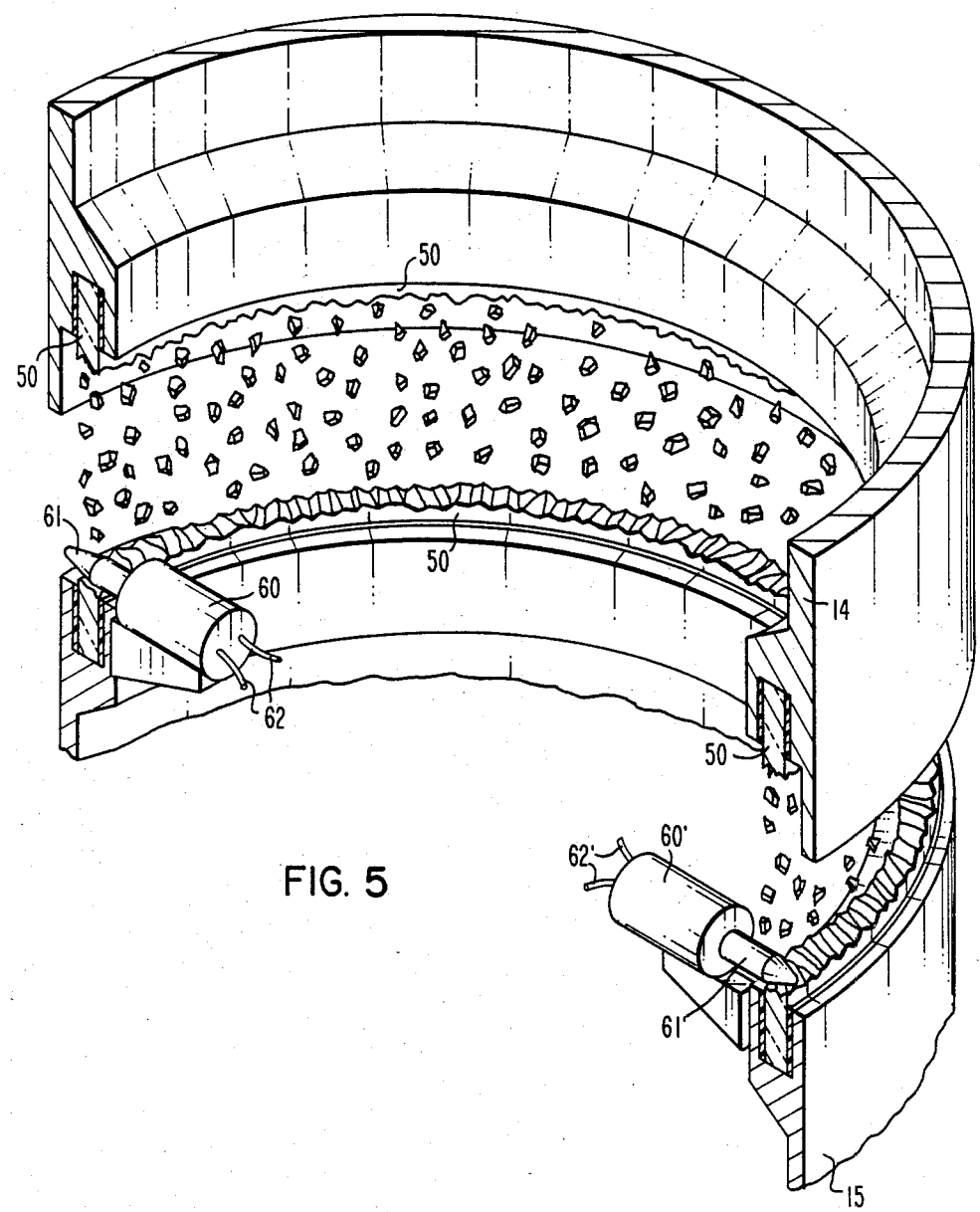
FIG. 5 illustrates the separate portions of the instrumentation package.

The high strength joint is slightly flexible and can be subject to relatively high axial loads and stresses without breaking. If the surface of the glass is punctured however, residual surface stresses cause the entire exposed window to shatter into relatively small grains. The means to accomplish this puncturing and shattering is provided by a commerically available pyrotechnic device 60 which, when provided with a signal via lines 62, will propel a sharp-tipped carbide plunger 64 into the glass cylinder which then disintegrates as illustrated in FIG. 4, and as illustrated in FIG. 5, the joint separates cleanly.

In order to provide for a high degree of reliability, a redundant pyrotechnic device 60' may be provided to shatter the glass by propelling its carbide plunger 61' against it upon a signal via lines 62'.

Since the glass cylinder 50 may be subject to shattering during handling and storage, a protective skirt 70 is provided to cover the window. The protective skirt may be bonded to one of the cylidrical body portions, or, as illustrated in FIG. 2, may be made an integral part thereof. The protective skirt 70 forms an extension of the lower end of the first cylindrical body portion 14.

Accordingly, a joint release mechanism has been described which utilizes a relatively small pyrotechnic device to shatter a glass cylinder connecting separable portions of a unit. The arrangement is capable of withstanding all mission loads before separation, separates cleanly upon activation, and provides the maximum possible usable free inside diameter of the unit to allow for a greater payload. The arrangement is small in cross-sectional area and relatively inexpensive to produce.

We claim:

1. A joint release mechanism comprising:
   (A) a first cylindrical body portion having a longitudinal axis and an outer surface;
   (B) a second cylindrical body portion coaxially arranged with respect to said first cylindrical body portion and having an outer surface;
   (C) a cylindrically shaped member of frangible material affixed to both said first and second cylindrical body portions to secure them in position relative to one another and being entirely within the confines of said outer surfaces of said first and second cylindrical body portions; and
   (D) plunger means positioned behind said frangible material and being entirely within the confines of said outer surfaces of said first and second cylindrical body portions for breaking said frangible material whereby said first and second cylindrical body portions may separate.

2. Apparatus according to claim 1 wherein:
   (A) said first and second cylindrical body portions are right circular cylinders.

3. Apparatus according to claim 2 wherein:
   (A) said frangible member is a right circular cylinder.

4. Apparatus according to claim 1 wherein:
   (A) said frangible material is glass.

5. Apparatus according to claim 4 wherein:
   (A) said glass is chemically tempered glass.

6. Apparatus according to claim 3 wherein:
   (A) said first cylindrical body portion includes a first notch in an end thereof;
   (B) said first notch having a certain depth and being symmetrically disposed about said longitudinal axis;
   (C) said second cylindrical body portion includes a second notch in an end thereof;
   (D) said second notch having a certain depth and being symmetrically disposed about said longitudinal axis;
   (E) said frangible member being positioned within, and bonded to, both said notches to maintain said first and second cylindrical body portions in spaced-apart relationship with an exposed portion of said frangible material therebetween.

7. Apparatus according to claim 6 which includes:
   (A) a protective skirt positioned to cover the outside exposed portion of said frangible material.

8. Apparatus according to claim 7 wherein:
   (A) said protective skirt is connected to said first cylindrical body portion.

9. Apparatus according to claim 1 wherein:
   (A) said means for breaking is an electrically operated pyrotechnic device including a striker;
   (B) said means for breaking is positioned so that when activated, said striker will contact said frangible material and break it.

10. Apparatus according to claim 9 wherein:
    (A) said means for breaking is located within the structure formed by said cylindrical body portions of frangible material.

11. Apparatus according to claim 9 which includes:
    (A) at least two said pyrotechnic devices.

* * * * *